US010796473B1

(12) United States Patent
Lim et al.

(10) Patent No.: US 10,796,473 B1
(45) Date of Patent: Oct. 6, 2020

(54) RENDERING POST-CAPTURE ARTIFICIAL-REALITY EFFECTS BASED ON ARTIFICIAL-REALITY STATE INFORMATION

(71) Applicant: Facebook, Inc., Menlo Park, CA (US)

(72) Inventors: Jonathan Lim, San Francisco, CA (US); Yuanshuo Lu, Sunnyvale, CA (US); Mohmmad Feisal Saleh Amir Rasras, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/216,217

(22) Filed: Dec. 11, 2018

(51) Int. Cl.
*G06T 15/00* (2011.01)
*G06T 19/00* (2011.01)
*H04N 21/81* (2011.01)
*G06K 9/00* (2006.01)
*G06T 19/20* (2011.01)

(52) U.S. Cl.
CPC ........ *G06T 15/005* (2013.01); *G06K 9/00201* (2013.01); *G06K 9/00228* (2013.01); *G06T 19/006* (2013.01); *G06T 19/20* (2013.01); *H04N 21/8146* (2013.01)

(58) Field of Classification Search
CPC ..... G06T 15/005; G06T 19/006; G06T 19/20; H04N 21/8146; G06K 9/00228; G06K 9/00201
See application file for complete search history.

(56) References Cited

U.S. PATENT DOCUMENTS

| 2014/0354685 | A1* | 12/2014 | Lazarow | G02B 27/0172 345/633 |
| 2017/0301140 | A1* | 10/2017 | Smith | G06T 19/006 |
| 2018/0210628 | A1* | 7/2018 | McPhee | G06F 3/0488 |
| 2018/0336715 | A1* | 11/2018 | Rickwald | G06T 13/40 |

* cited by examiner

*Primary Examiner* — William A Beutel
(74) *Attorney, Agent, or Firm* — Baker Botts L.L.P.

(57) ABSTRACT

In one embodiment, a method includes retrieving a video stream that was recorded while a first artificial-reality effect was being displayed on the video stream, where each frame of the video stream comprises a real-world scene without the first artificial-reality effect, retrieving an artificial-reality state information stream corresponding to the video stream, where the artificial-reality state information stream comprises state information associated with the first artificial-reality effect, retrieving one or more contextual data streams corresponding to the video stream, where the first artificial-reality effect displayed on the video stream was rendered based on at least a portion of the one or more contextual data streams, rendering a second artificial-reality effect based on at least a portion of the artificial-reality state information stream and a portion of the one or more contextual data streams, and displaying the second artificial-reality effect on the video stream.

19 Claims, 7 Drawing Sheets

RENDERING POST-CAPTURE ARTIFICIAL-REALITY EFFECTS BASED ON ARTIFICIAL-REALITY STATE INFORMATION

TECHNICAL FIELD

This disclosure generally relates to artificial reality, and in particular, to rendering post-capture artificial-reality effects based on artificial-reality effect state information.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a first computing device may capture an artificial-reality state information stream when the first computing device records a video stream while a first artificial-reality effect is being displayed on the video stream. The first computing device may capture one or more contextual data streams corresponding to the video stream. With legacy solutions, a computing device may fuse an artificial-reality effect into the recorded video stream for recording a video stream with the artificial-reality effect. In such cases, the artificial-reality effect cannot be changed after the video stream is recorded. Furthermore, when an artificial-reality effect is added to a post-capture video stream with no artificial-reality effect based on post-capture image processing, certain artificial-reality effects may not be feasible due to lack of artificial-reality state information data associated with the video stream or due to lack of contextual data associated with the video stream. The first computing device may enable richer, more dynamic post-capture editing (e.g., removing, changing, creating) of artificial-reality effects by capturing the artificial-reality state information stream and one or more contextual data streams separate from the video stream. An artificial-reality state information data corresponding to a frame of the video stream may comprise state information associated with the first artificial-reality effect displayed on the frame of the video stream. An artificial-reality state information data may be captured for each frame of the video stream. The captured artificial-reality state information stream may be compressed and stored separately from the video stream data. An artificial-reality state information data in the artificial-reality state information stream may comprise a timestamp that may correlate the artificial-reality state information data with a corresponding frame of the video. The artificial-reality state information data may comprise randomness data used for generating one or more non-deterministic features (e.g., rain drop sizes, positions, and paths, timing and trajectories for shooting arrows, bubble sizes and moving paths, firework trajectories, etc.) of artificial-reality effect on the video stream. The randomness data may be generated by a randomness model of the artificial-reality effect and may have different values each time the randomness model is re-run. The one or more contextual data streams may comprise a sensor data stream generated by one or more sensors while the video stream is being captured. The one or more sensors may comprise an accelerometer, a gyro, a motion sensor, a depth sensor, a temperature sensor, a microphone, or any suitable sensor. The one or more contextual data streams may comprise a computed data stream generated by an object tracking algorithm performed on content of the video stream. The computed data related to the video content may comprise face tracking data, person/object segmentation data, world tracking data, point cloud data, feature point data, or any suitable computed data generated by an object tracking algorithm. The one or more contextual data streams may be compressed and stored separately from the video stream data. A contextual data of the one or more contextual data stream may comprise a timestamp that may correlate the contextual data with a corresponding frame of the video.

In particular embodiments, a second computing device may replay the video stream with the second artificial-reality effect using the video stream, the artificial-reality state information stream, and one or more contextual data streams. In particular embodiments, the second artificial-reality effect may be identical to the first artificial-reality effect. In particular embodiments, the second computing device may be identical to the first computing device. The second computing device may render the second artificial-reality effect based on at least a portion of the artificial-reality state information stream and a portion of the one or more contextual data streams. The second computing device may display the second artificial-reality effect on the video stream. In particular embodiments, the second computing device may remove the artificial-reality effect from the video stream. In particular embodiments, the second computing device may replace the second artificial-reality effect with a third artificial-reality effect by rendering the third artificial-reality effect based on at least a portion of the artificial-reality state information stream and a portion of the one or more contextual data streams and displaying the third artificial-reality effect on the video stream. The second computing device may render a new artificial-reality effect without regenerating or re-capturing the artificial-reality state information or the one or more contextual data. Therefore, the second computing device may reduce the power consumption for applying a new artificial-reality effect on the video stream.

A computing device may retrieve a video stream that was recorded while a first artificial-reality effect was being displayed on the video stream. Each frame of the video stream may comprise a real-world scene without the first artificial-reality effect. The computing device may retrieve an artificial-reality state information stream corresponding to the video stream. The artificial-reality state information stream may comprise state information associated with the first artificial-reality effect while it was being displayed on the video stream. The computing device may retrieve one or more contextual data streams corresponding to the video stream. The first artificial-reality effect displayed on the video stream may have been rendered based on at least a portion of the one or more contextual data streams. The computing device may render a second artificial-reality effect based on at least a portion of the artificial-reality state information stream and a portion of the one or more contextual data streams. The computing device may display the second artificial-reality effect on the video stream.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
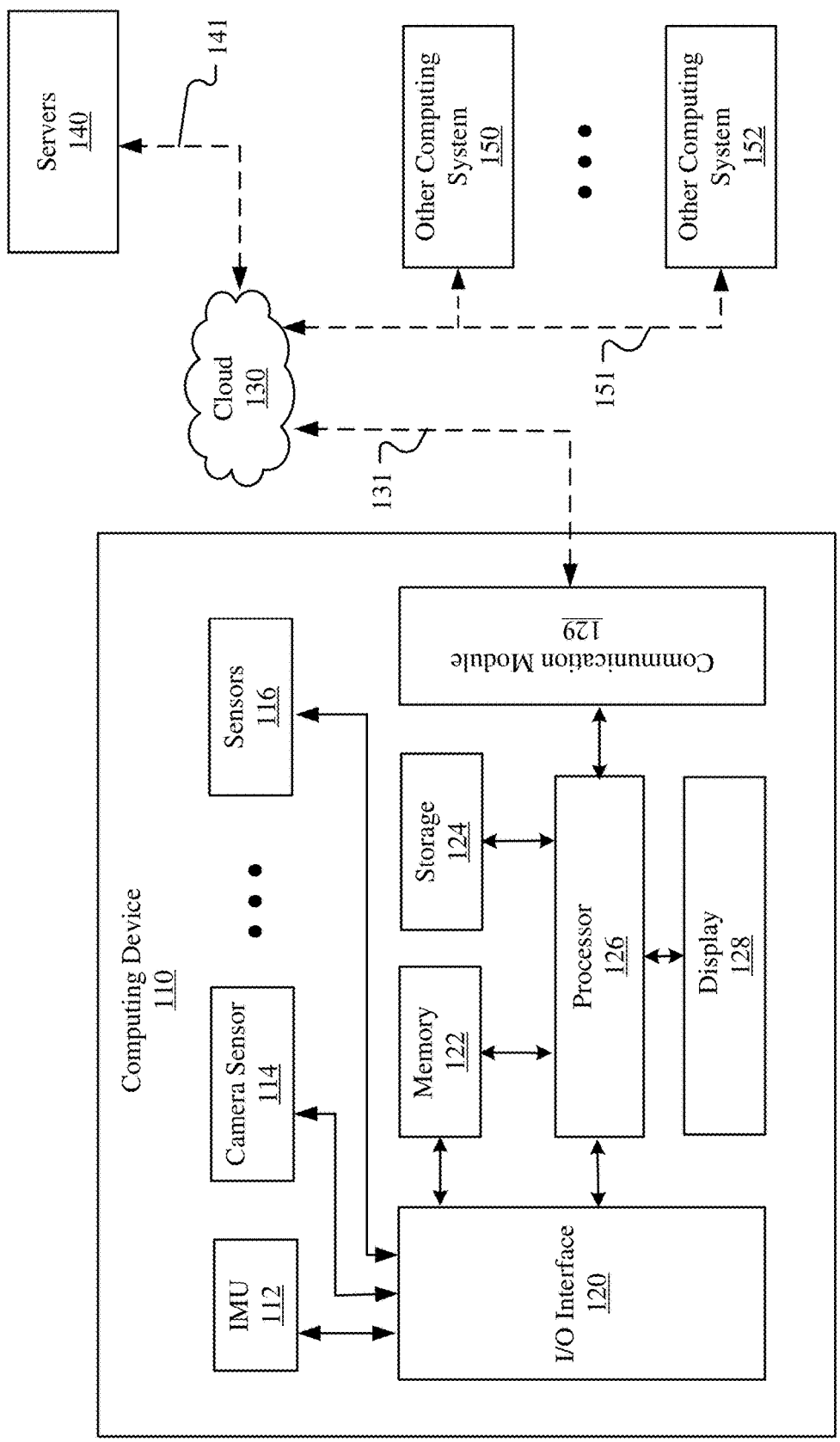
FIG. 1 illustrates an example artificial-reality system.

FIG. 1 illustrates an example artificial-reality system 100. In particular embodiments, the system 100 may include one or more computing devices (e.g., 110, 150, 152) and one or more servers 140. In particular embodiments, a computing device may be a desktop computer, a laptop computer, a tablet computer, a mobile phone, a camera, an artificial-reality headset, a wearable computing device, a portable computing device, a user terminal device, or any suitable computing device. The computing devices and the servers may be connected through a cloud 130. In particular embodiments, the computing device 110 may include one or more processors 126, a memory 122, a storage 124, a display 128, an input/output interface 120, a communication module 129, etc. In particular embodiments, the computing device 110 may include or be coupled to a number of sensors including, for example, but not limited to, an inertial measurement unit (IMU) 112 (which may include accelerometers, gyroscopes, motion sensors, velocity sensors, orientation sensor, etc.), one or more camera sensors 114, other sensors 116 (e.g. microphones, GPS sensors, light sensors, infrared sensors, distance sensors, position sensors, light sensors, touch sensors, stylus sensors, controller sensors, temperature sensors, gesture sensors, user input sensors, etc.). The computing devices (e.g., 110 151, 152) may be connected to the cloud 130 through wired or wireless connections (e.g., 131, 151) and may be connected to the servers 140 through the cloud 130 and a wired or wireless connection 141.

With legacy artificial-reality effect recording solutions, a computing device may fuse an artificial-reality effect into the recorded video stream for recording a video stream with the artificial-reality effect. In such cases, the artificial-reality effect cannot be changed after the video stream is recorded. Furthermore, when an artificial-reality effect is added to a post-capture video stream with no artificial-reality effect based on post-capture image processing, certain artificial-reality effects may not be feasible due to lack of artificial-reality state information data associated with the video stream or due to lack of contextual data associated with the video stream. If a computing device captures contextual data separately from the video stream data in order to mitigate such problems, the replaying computing device may not be able to produce exactly identical artificial-reality effect on the replayed video stream due to lack of artificial-reality state information comprising adjustable deterministic parameters for artificial-reality effect such as a position and a size of an added virtual object at a given time, or randomness data for non-deterministic parameters for artificial-reality effect. A method In particular embodiments, a first computing device 110 may capture an artificial-reality state information stream when the first computing device 110 records a video stream while a first artificial-reality effect is being displayed on the video stream. The first computing device 110 may capture one or more contextual data streams corresponding to the video stream. The first computing device 110 may enable richer, more dynamic post-capture editing (e.g., removing, changing, creating) of artificial-reality effects by capturing the artificial-reality state information stream and one or more contextual data streams separate from the video stream. An artificial-reality state information data corresponding to a frame of the video stream may comprise state information associated with the first artificial-reality effect displayed on the frame of the video stream. An artificial-reality state information data may be captured for each frame of the video stream. The captured artificial-reality state information stream may be compressed and stored separately from the video stream data. An artificial-reality state information data in the artificial-reality state information stream may comprise a timestamp that may correlate the artificial-reality state information data with a corresponding frame of the video. The artificial-reality state information data may comprise randomness data used for generating one or more non-deterministic features (e.g., rain drop sizes, positions, and paths, timing and trajectories for shooting arrows, bubble sizes and moving paths, firework trajectories, etc.) of artificial-reality effect on the video stream. The randomness data may be generated by a randomness model of the artificial-reality effect and may have different values each time the randomness model is re-run. The one or more contextual data streams may comprise a sensor data stream generated by one or more sensors while the video stream is being captured. The one or more sensors may comprise an accelerometer, a gyro, a motion sensor, a depth sensor, a temperature sensor, a microphone, or any suitable sensor. The one or more contextual data streams may comprise a computed data stream generated by an object tracking algorithm performed on content of the video stream. The computed data related to the video content may comprise face tracking data, person/object segmentation data, world tracking data, point cloud data, feature point data, or any suitable computed data generated by an object tracking algorithm. The one or more contextual data streams may be compressed and stored separately from the video stream data. A contextual data of the one or more contextual data stream may comprise a timestamp that may correlate the contextual data with a corresponding frame of the video.

In particular embodiments, a second computing device may replay the video stream with the second artificial-reality effect using the video stream, the artificial-reality state information stream, and one or more contextual data streams. In particular embodiments, the second artificial-reality effect may be identical to the first artificial-reality effect. In particular embodiments, the second computing device may be identical to the first computing device. The second computing device may render the second artificial-reality effect based on at least a portion of the artificial-reality state information stream and a portion of the one or more contextual data streams. The second computing device may display the second artificial-reality effect on the video stream. In particular embodiments, the second computing device may remove the artificial-reality effect from the video stream. In particular embodiments, the second computing device may replace the second artificial-reality effect with a third artificial-reality effect by rendering the third artificial-reality effect based on at least a portion of the artificial-reality state information stream and a portion of the one or more contextual data streams and displaying the third artificial-reality effect on the video stream. The second computing device may render a new artificial-reality effect without regenerating or re-capturing the artificial-reality state information or the one or more contextual data. Therefore, the second computing device may reduce the power consumption for applying a new artificial-reality effect on the video stream.

Figure 2:
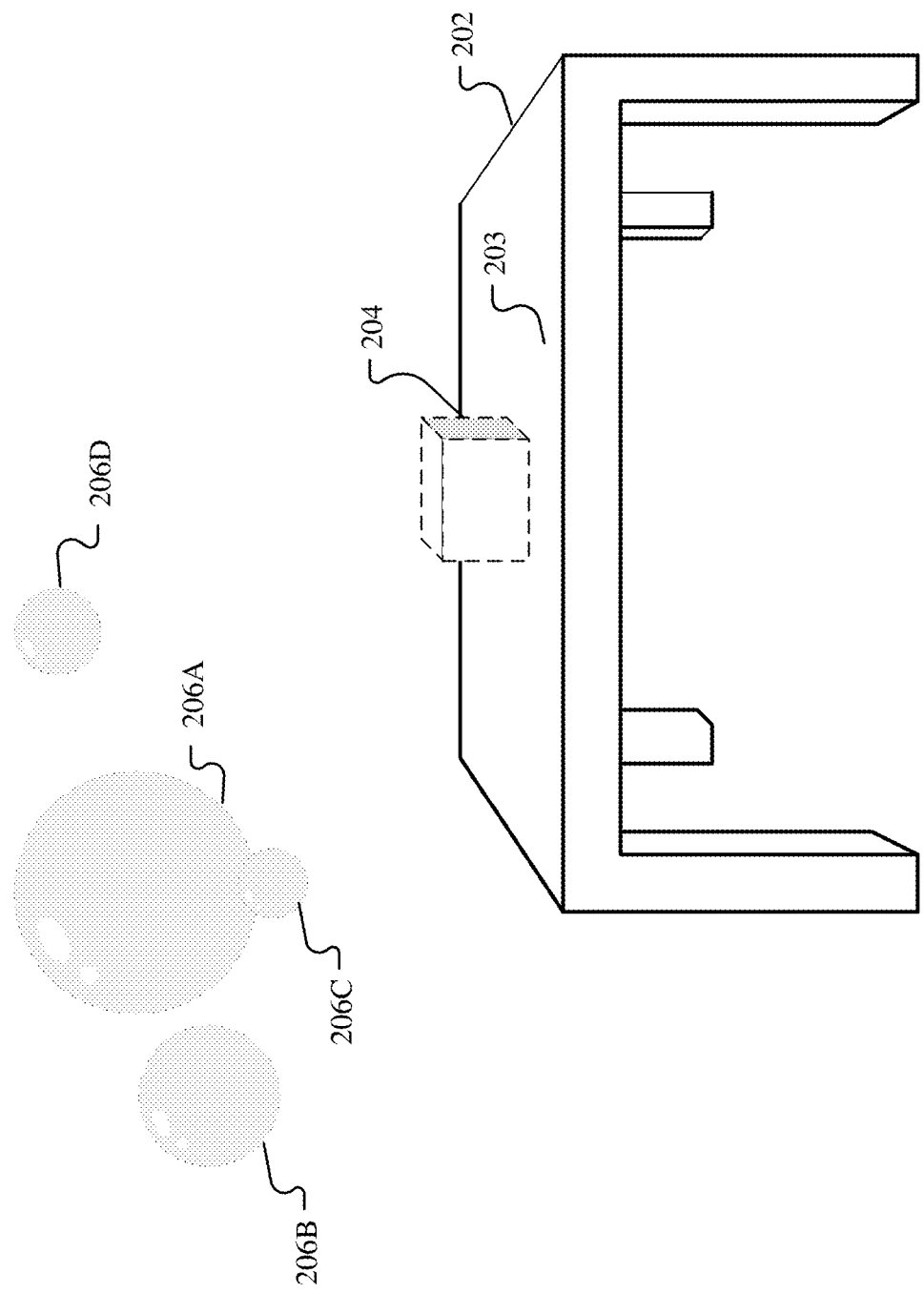
FIG. 2 illustrates an example artificial-realty effect displayed on a live-captured video stream.

FIG. 2 illustrates an example artificial-realty effect displayed on a live-captured video stream. In particular embodiments, the first computing device 110 may capture a video data stream, artificial-reality state information stream and one or more contextual data streams (e.g., sensor data stream, computed data stream) of a scene. For example, the first computing device 110 may capture a video data stream of a scene that includes a table 202. In particular embodiments, the video data stream may be a raw video data stream or a video stream in any suitable formats as captured by a camera sensor. In particular embodiments, the one or more contextual data streams may comprise a sensor data stream including sensor data from one or more sensors associated with first computing device 110. The one or more sensors may comprise IMU sensors 112, camera sensors 114, and any other sensors 116. The first computing device 110 may also use one or more microphones to capture the audio data stream associated with the video data stream. In particular embodiments, the one or more contextual data streams may comprise one or more computed data streams (e.g., object recognition data, object feature recognition data, face recognition data, face tracking data, etc.) based on the captured video data stream. For example, the first computing device 110 may use an object recognition algorithm to recognize the table 202, the surface 203, and other object features, such as, surfaces, corners, edges, lines, shapes etc. In particular embodiments, the first computing device 110 may render an artificial-reality effect in the scene of the captured video stream. For example, the first computing device 110 may render a virtual object 202 on the surface 203 of the table 202. The first computing device 110 may also render a number of virtual bubbles 206A, 206B, 206C and 206D floating in the air. A size, a position, and a moving direction of each bubble at a given moment of time may be determined based on randomness data that the first computing device 110 may generate using a randomness model. The first computing device 110 may capture an artificial-reality state information stream that comprises artificial-reality state information data comprising identifications of rendered artificial-reality effects and parameters applied to the rendered artificial-reality effects including the randomness data for each frame of the video stream. The rendered virtual object 202 and the virtual bubbles 206A-206D may be displayed to a user on a display, such as, a screen, a head-mounted display, etc. Although this disclosure describes rendering artificial-reality effects on a live video stream in a particular manner, this disclosure contemplates rendering artificial-reality effects on a live video stream in any suitable manner.

As an example and not by way of limitation, a user may use the first computing device 110 to capture and record a video of the scene which includes a table 202. The first computing device 110 may have a camera sensor 114. The user may move around the table 202 while recording the video. The camera sensor 114 be initially at a first position and may move to a second position during the video recording process while the user walks around the table 202. During the video recording process, the first computing device 110 may display the captured video stream on a display 128 (e.g., a display screen, a head-mounted display (HMD)) in real-time to the user. At the same time, the first computing device 110 may render an artificial-reality effect for display with the captured video stream. For instance, the artificial-reality headset may render a virtual object 204 on the table 202 in the scene displayed by the first computing device to the user. When the user looks at the scene displayed by the first computing device 110, the user may see both the images of the real-world objects (e.g., the table 202) and the artificial-reality effect (e.g., the virtual object 204) rendered by the first computing device 110.

In particular embodiments, the first computing device 110 may use a camera sensor 114 to capture a video stream of a scene. The captured video stream may be raw video stream or in any suitable compressed or uncompressed video formats. The video formats may include, for example, but are not limited to, audio video interleave (AVI), flash video format (FLV), windows media video (WMV), QuickTime movie (MOV), moving picture expert group 4 (MP4), etc. In particular embodiments, the captured video data stream may be compressed by a live compression algorithm. The computing device may capture one or more contextual data streams associated with the video data streams including, for example, but not limited to, one or more sensor data streams (e.g., raw sensor data streams, IMU data, accelerometer data, gyroscope data, motion data, device orientation data), one or more computed data streams (e.g., face recognition data, face tracking points, person segmentation data, object recognition data, object tracking points, object segmentation data, body tracking points, world tracking points, optical flow data for motion, depth of scene, points in 3D space, lines in 3D space, surfaces in 3D space, point cloud data), or one or more sound data streams. The captured video data stream and contextual data streams may be serialized and stored in a storage, which may be associated with the computing device, the cloud, the servers, or other computing devices, for post-capture editing or replaying. In particular embodiment, the serialized data stream may allow the recorded scene to be simulated or produced deterministically regardless of the type of computing devices that are used for replaying. In particular embodiments, the computer system may capture video data stream and the contextual data streams of a scene only without rendering artificial-reality effects in the scene while capturing the video and contextual data streams.

In particular embodiments, the artificial-reality effect may be rendered based on computed data generated by a tracking algorithm (e.g., object recognition algorithm, face recognition algorithm). The computed data may include, for example, but is not limited to, face recognition data, face tracking points, person segmentation data, object recognition data, object tracking points, object segmentation data, body tracking points, world tracking points, depth of scene, points in 3D space, surfaces in 3D space, point cloud data, optical field data for motion, etc. For example, the first computing device 110 may use an object recognition algorithm to identify the surface 203 of the table 202 and may render the virtual object 204 on the surface 203 based on the object recognition data. As another example, the computing device may use a face recognition algorithm to identify and track a user face and render a virtual mask on the user face based on face recognition data. As another example, the computing device may use a tracking algorithm to track the relative position (e.g., distance, angle, orientation) of the surface 203 in the scene to the camera sensor 114 and may render the virtual object 204 on the surface 203 based on the relative position data (e.g., with different view angles).

In particular embodiment, the artificial-reality effect may be rendered based on the sensor data stream generated by one or more sensors associated with the first computing device 110. The sensor data stream may be generated by one or more sensors of the first computing device 110 when the video is being captured or when the artificial-reality effect is being rendered during a relaying process. In particular embodiments, the sensor data streams may be generated by one or more sensors associated with the first computing device 110 including, for example, but not limited to, an inertial measurement unit (IMU), an accelerometer, a device orientation sensor, a motion sensor, a rotation sensor, a velocity sensor, a device position sensor, a microphone, a light sensor, a touch sensor, a stylus sensor, a controller sensor, a depth sensor, a distance sensor, a temperature sensor, a GPS sensor, a camera sensor, a gesture sensor, a user input sensor, a point cloud sensor, etc. For example, the virtual object 204 may be rendered with different view angles to the user according to the camera sensor's position so that the virtual object 204 may appear to be statically on the table 202 as viewed by the user from the display when the user moves around the table 202. As another example, an interaction effect (e.g., rotating, moving, lifting up, putting down, hiding, etc.) of the virtual object 204 may be rendered by the first computing device 110 based on the real-time user inputs from one or more user input sensors (e.g., a touch sensor, a controller sensor, a moving sensor, an accelerometer, a microphone, a camera sensor, a gesture sensor or any suitable user input sensors). In particular embodiments, the sensor data stream may include information related to the camera sensor 114, for example and not limited to, position, orientation, view angle, distance to the real-world object (e.g., the table 202), depth of view, moving speed, moving direction, acceleration, etc. The sensor data stream may further include information related to lighting condition, sound, user inputs (e.g., through touch sensors, stylus sensors, controller sensors, etc.), temperature, location (e.g., through GPS sensor), etc.

Figure 3:
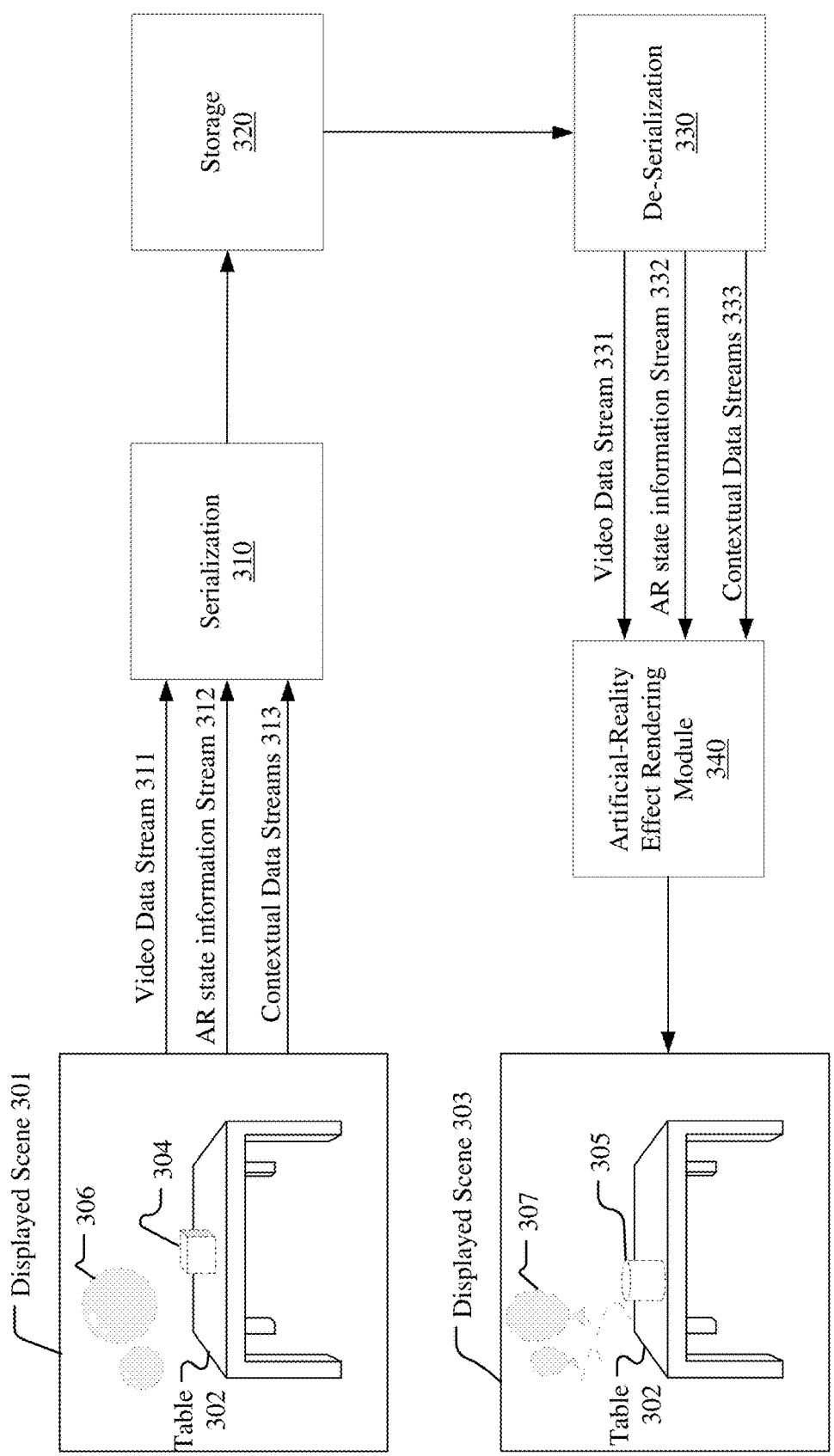
FIG. 3 illustrates an example framework for an artificial realty effect based on artificial-reality state information stream and one or more contextual data streams.

FIG. 3 illustrates an example framework 300 for an artificial realty effect based on artificial-reality state information stream and one or more contextual data streams. In particular embodiments, the first computing device 110 may capture a video data stream 311, an artificial-reality state information stream 312 and one or more contextual data streams 313 of a scene 301. The first computing device 110 may capture a video data stream 311 of the scene 301 which includes a table 302. In particular embodiments, the video data stream 311 may be a raw video data stream or a video stream in any suitable formats as captured by a camera sensor 114. In particular embodiments, the artificial-reality state information stream 312 may comprise one or more identifiers for rendered artificial-reality effects on the scene and parameters applied to the rendered artificial-reality effects. In the example illustrated in FIG. 3, the displayed scene 301 may comprise a virtual object 304 placed on top of the table 302 and a plurality of virtual bubbles 306. The artificial-reality state information data of the artificial-reality state information stream 312 may comprise identifiers for the virtual object 304 and the virtual bubbles 306. The artificial-reality state information data of the artificial-reality state information stream 312 may comprise parameters associated with the virtual object 304 including the size and the position of the virtual object 304. The artificial-reality state information data of the artificial-reality state information stream 312 may also comprise parameters associated with the virtual bubbles 306 including sizes of bubbles, locations of bubbles, and moving directions of bubbles. Because a size and a moving direction of a floating bubble may not be randomly determined when the bubble is rendered, the first computing device 110 may generate randomness data for those non-deterministic features by using a randomness model. The artificial-reality state information data of the artificial-reality state information stream 312 may also comprise the generated randomness data. In particular embodiments, the one or more contextual data streams 313 may comprise a sensor data stream including sensor data from one or more sensors associated with computing device. The one or more sensors associated with the first computing device 110 may comprise IMU sensors, orientation sensors, motion sensors, velocity sensors, device position sensors, or any suitable sensors. The first computing device 110 may also use one or more microphones to capture the audio data stream associated with the video data stream 311. In particular embodiments, the one or more contextual data streams 313 may also comprise one or more computed data streams (e.g., object recognition data, object feature recognition data, face recognition data, face tracking data, etc.) based on the captured video data stream 311. The first computing device 110 may use an object recognition algorithm to recognize the table 304, the surface, and other object features, such as, surfaces, corners, edges, lines, shapes etc. Although this disclosure describes capturing artificial-reality state information stream and one or more contextual data streams while rendering artificial-reality effects on a live video stream in a particular manner, this disclosure contemplates capturing artificial-reality state information stream and one or more contextual data streams while rendering artificial-reality effects on a live video stream in any suitable manner.

In particular embodiments, the first computing device 110 may send the captured video data stream 311, the artificial-reality state information stream 312 and the contextual data streams 313 to a serializer 310. The serializer 310 may serialize the video data stream 311 and the artificial-reality state information stream 312 and the contextual data streams 313 and store the streams into a storage 320 (e.g., a local storage of the computing system, a cloud, a server, an associated storage, a storage of another computing system, etc.). The serializer 310 may be a part of the first computing device 110. In particular embodiments, the computing system may compress the serialized data stream 221 into a compressed format before storing it in the storage 220. Although this disclosure describes serializing and storing data streams for artificial-reality effects on a video stream in a particular manner, this disclosure contemplates serializing and storing data streams for artificial-reality effects on a video stream in any suitable manner.

In particular embodiments, a second computing device 110 may retrieve a video stream 331 that was recorded while a first artificial-reality effect was being displayed on the video stream from the storage 320. The second computing device 110 may extract a video data stream 331, an artificial-reality state information stream 332, and one or more contextual data streams 333 by using a de-serializer 330. The de-serializer 330 may de-serialize the retrieved serialized data stream into the video data stream 331, the artificial-reality state information stream 332, and the one or more contextual data streams 333. The de-serializer 330 may be a part of the second computing device 110. In particular embodiments, the second computing device 110 may be the first computing device 110. In particular embodiments, the second computing device 110 may be different from the first computing device 110. Each frame of the video stream 331 may comprise a real-world scene without the first artificial-reality effect. The first artificial-reality effect may comprise a virtual object, a three-dimensional effect, an interaction effect, a displaying effect, a sound effect, a lighting effect, or a tag. As an example and not by way of limitation, the video data stream 331 may comprise a scene with the table 302 without having any artificial-reality effect. Although this disclosure describes retrieving a video stream in a particular manner, this disclosure contemplates retrieving a video stream in any suitable manner.

In particular embodiments, the second computing device 110 may retrieve an artificial-reality state information stream 332 corresponding to the video stream 331. The artificial-reality state information stream 332 may comprise state information associated with the first artificial-reality effect while it was being displayed on the video stream. The artificial-reality state information may comprise an identifier for the rendered artificial-reality effect. The artificial-reality state information may comprise applied parameters associated with the rendered artificial-reality effect. The artificial-reality state information may comprise randomness data used for generating one or more non-deterministic features of artificial-reality effect on the video stream 331. The one or more non-deterministic features may comprise a size of a rain drop, a path of a rain drop, a timing of a rain drop, a size of a snowflake, a path of a snowflake, a timing of a snowflake, a direction of a flying arrow, a trajectory of a flying arrow, a timing of a flying arrow, a size of a bubble, a moving path of a bubble, a moving speed of a bubble, or any suitable features that may not be determined in advance.

As an example and not by way of limitation, the artificial-reality state information of the artificial-reality state information stream 332 may comprise an identifier for the virtual object 304 and an identifier for the virtual bubbles 306. The artificial-reality state information may comprise the size and the location of the virtual object 304. The artificial-reality state information may also comprise randomness data used for determining the size, location and moving direction for each of the rendered virtual bubble 306. Although this disclosure describes retrieving an artificial-reality state information stream in a particular manner, this disclosure contemplates retrieving an artificial-reality state information stream in any suitable manner.

In particular embodiments, the second computing device 110 may retrieve one or more contextual data streams 333 corresponding to the video stream 331. The first artificial-reality effect displayed on the video stream may have been rendered based on at least a portion of the one or more contextual data streams 333. In particular embodiments, the one or more contextual data streams 333 may comprise one or more sensor data streams generated by one or more sensors while the video stream is being captured. The one or more sensors may comprise an inertial measurement unit (IMU), an accelerometer, a device orientation sensor, a motion sensor, a velocity sensor, a device position sensor, a microphone, a light sensor, a touch sensor, a stylus sensor, a depth sensor, a temperature sensor, a GPS sensor, or a user input sensor. Although this disclosure describes retrieving a sensor data stream in a particular manner, this disclosure contemplates retrieving a sensor data stream in any suitable manner.

In particular embodiments, the one or more contextual data streams 333 may comprise a computed data stream generated by an object tracking algorithm performed on content of the video stream. The computed data may comprise face recognition data, face tracking points, person segmentation data, object recognition data, object tracking points, object segmentation data, body tracking points, world tracking points, a depth, a point in a three-dimensional space, a line in a three-dimensional space, a surface in a three-dimensional space, or a point cloud. Although this disclosure describes retrieving a computed data stream in a particular manner, this disclosure contemplates retrieving a computed data stream in any suitable manner.

In particular embodiments, the second computing device 110 may determine the second artificial-reality effect to be displayed on the video stream while the video stream is replayed. In particular embodiments, the second computing device 110 may determine the second artificial-reality effect identical to the first artificial-reality effect by default. In particular embodiments, the second computing device 110 may determine the second artificial-reality effect based on an input of a user associated with the second computing device 110. The second computing device 110 may present choices for the second artificial-reality effect to the user in order to determine the second artificial-reality effect based on the input of the user. The choices for the second artificial-reality may comprise no artificial-reality effect, the first artificial-reality effect, or one or more artificial-reality effects different from the first artificial-reality effect. The second computing device 110 may receive an indication of a user choice from one or more input sensors associated with the second computing device 110. The second computing device 110 may determine the second artificial-reality effect based on the received indication of the user choice. As an example and not by way of limitation, the second computing device 110 may present choices to the user associated with the second computing device 110. The user may choose the first artificial-reality effect that was displayed on the video stream while the video stream was being captured. The second computing device 110 may determine that the second artificial-reality effect is identical to the first artificial-reality effect. As another example and not by way of limitation, the second computing device 110 may present choices to the user. The user may choose that no artificial-reality effect should be displayed on the video stream. As yet another example and not by way of limitation, the second computing device 110 may present choices to the user. The user may choose a new artificial-reality effect for the second artificial-reality effect. Although this disclosure describes determining a second artificial-reality effect to be displayed on the replayed video stream in a particular manner, this disclosure contemplates determining a second artificial-reality effect to be displayed on the replayed video stream in any suitable manner.

In particular embodiments, the artificial-reality effect rendering module 340 of the second computing device 110 may render a second artificial-reality effect based on at least a portion of the artificial-reality state information stream 332 and a portion of the one or more contextual data streams 333. The second artificial-reality effect may be identical to the first artificial-reality effect. In such cases, the artificial-reality effect rendering module 340 may render the second artificial-reality effect identical to the first artificial-reality effect based on at least a portion of the artificial-reality state information stream 332 and a portion of the one or more contextual data streams 333. The artificial-reality effect rendering module 340 may generate one or more non-deterministic features of the second artificial-reality effect based at least on the randomness data in the artificial-reality state information stream 332. The second computing device 110 may display the second artificial-reality effect on the video stream. As an example and not by way of limitation, if the second computing device 110 determined that the second artificial-reality effect is identical to the first artificial-reality effect, the artificial-reality effect rendering module 340 of the second computing device 110 may identify the virtual object 304 based on the artificial-reality effect state information in the artificial-reality state information stream 332. The artificial-reality effect rendering module 340 may identify the surface of the table 302 based on computed data of the one or more contextual data streams 333. The artificial-reality effect rendering module 340 may also determine an orientation of the surface based on sensor data of the one or more contextual data streams 333. The artificial-reality effect rendering module 340 may determine the size and the location of the virtual object 304 based on the artificial-reality state information of the artificial-reality state information stream 332, and render the virtual object 304 of the determined size to the determined location. The artificial-reality effect rendering module 340 of the second computing device 110 may identify virtual bubbles 306 based on the artificial-reality effect state information in the artificial-reality state information stream 332. The artificial-reality effect rendering module 340 may determine the size, location and moving direction of each of the one or more virtual bubbles 306 based on randomness data from the artificial-reality state information stream 332. The artificial-reality rendering module 340 may render the one or more bubbles 306 based on determined size, location and moving direction of each of the one or more bubbles. As the same randomness data may be used, the second artificial-reality effect may be exactly identical to the first artificial-reality effect. Although this disclosure describes rendering an artificial-reality effect on the replayed video stream identical to the artificial-reality effect rendered to the live-captured video stream in a particular manner, this disclosure contemplates rendering an artificial-reality effect on the replayed video stream identical to the artificial-reality effect rendered to the live-captured video stream in any suitable manner.

In particular embodiments, the second computing device 110 may replay the video stream on the screen associated with the second computing device 110 without rendering any artificial-reality effect if the second artificial-reality effect is determined to be null. Although this disclosure describes replaying the video stream without artificial-reality effect in a particular manner, this disclosure contemplates replaying the video stream without artificial-reality effect in any suitable manner.

Figure 4:
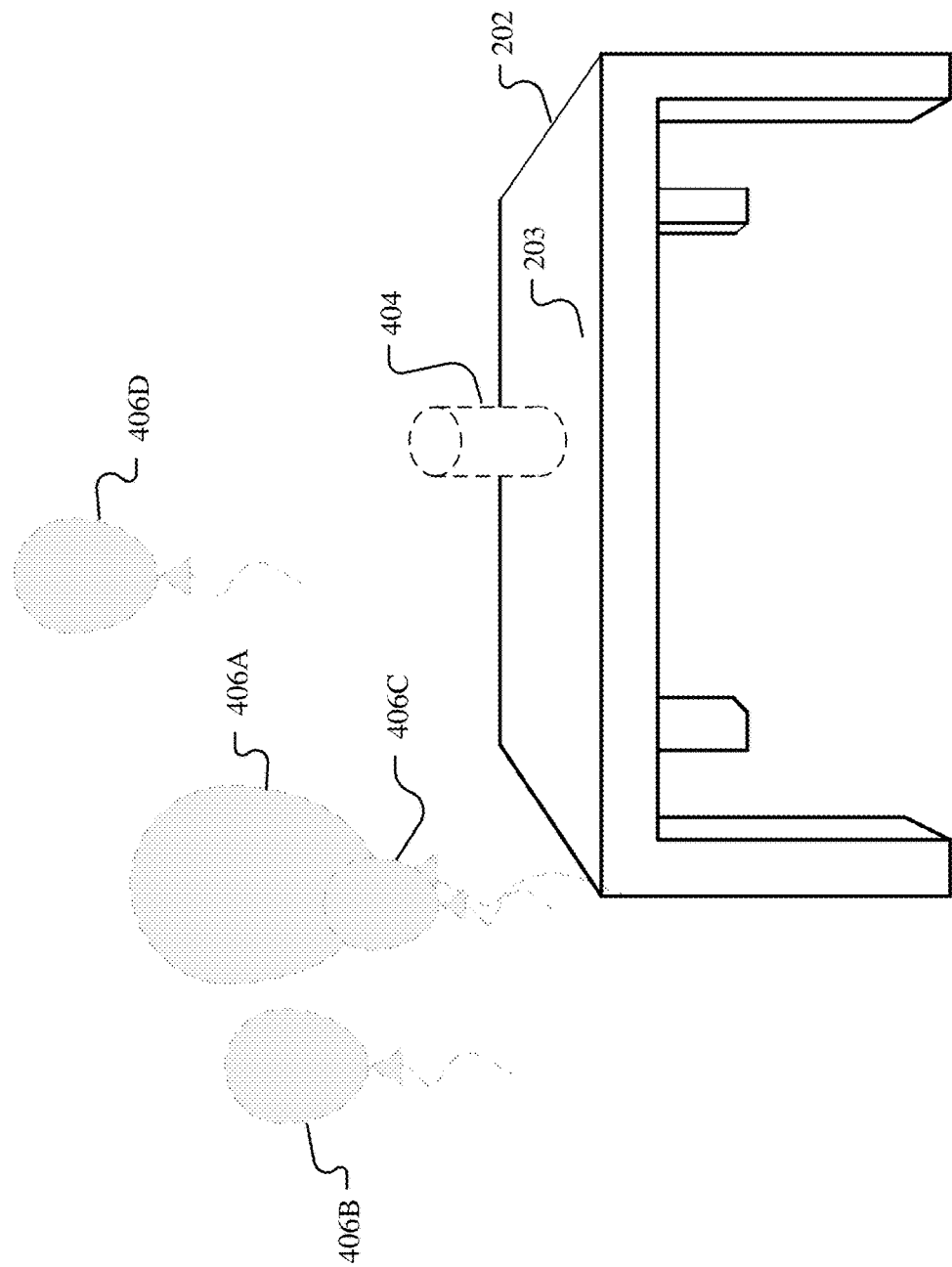
FIG. 4 illustrates an example artificial-realty effect displayed on a replayed video stream.

In particular embodiments, the artificial-reality effect rendering module 340 of the second computing device 110 may render the second artificial-reality effect based on at least a portion of the artificial-reality state information stream 332 and a portion of the one or more contextual data streams 333 if the second artificial-reality effect is different from the first artificial-reality effect. The artificial-reality effect rendering module 340 of the second computing device 110 may utilize the randomness data in the artificial-reality state information stream for one or more non-deterministic features of the second artificial-reality effect 307. The second computing device 110 may display the second artificial-reality effect 305, 307 on the video stream to construct a displayed scene 303. FIG. 4 illustrates an example artificial-realty effect displayed on a replayed video stream. As an example and not by way of limitation, illustrated in FIG. 4, the second computing device 110 may determine that the user wants to render a new artificial-reality effect on the replayed video stream. Based on the user input, the second computing device 110 may determine that a new virtual object 404 needs to be place on the surface 203 of the table 202. The artificial-reality effect rendering module 340 may identify the surface 203 based on the computed data of the computed data stream. The artificial-reality effect rendering module 340 may determine orientation of the surface 203 based on sensor data of the sensor data stream. The artificial-reality effect rendering module 340 may render the new virtual object 404 on the surface of the table 202 accordingly. In particular embodiments, the artificial-reality effect rendering module 340 may utilize the artificial-reality state information associated with the previously rendered virtual object 204 to render the new virtual object 404. Based on the user input, the second computing device 110 may determine that a plurality of virtual balloons 406A, 406B, 406C, and 406D needs to be rendered. The artificial-reality effect rendering module 340 may use randomness data of the artificial-reality state information stream 332 to determine a size, location, and moving direction of each of the plurality of virtual balloons 406A-406D. The artificial-reality effect rendering module 340 may render the plurality of virtual balloons 406A-406D based on the determined size, location and moving direction for each of the plurality of balloons 406A-406D. The second computing device 110 may display the virtual object 404 and virtual balloons 406A-406D on the video stream. Although this disclosure describes rendering a new artificial-reality effect on the replayed video stream in a particular manner, this disclosure contemplates rendering a new artificial-reality effect on the replayed video stream in any suitable manner.

In particular embodiments, the second computing device 110 may receive an indication that a user associated with the second computing device 110 wants to switch to a third artificial-reality effect in the middle of replaying the video stream from one or more input sensors associated with the second computing device 110. The second computing device 110 may stop rendering the second artificial-reality effect on the video stream. The second computing device 110 may render the third artificial-reality effect based on at least a portion of the artificial-reality state information stream 332 and a portion of the one or more contextual data streams 333. The second computing device 110 may display the third artificial-reality effect on the video stream. The second computing device 110 may utilize the randomness data in the artificial-reality state information stream 332 for one or more non-deterministic features of the third artificial-reality effect. Although this disclosure describes switching an artificial-reality effect in the middle of replaying a video stream in a particular manner, this disclosure contemplates switching an artificial-reality effect in the middle of replaying a video stream in any suitable manner.

Figure 5:
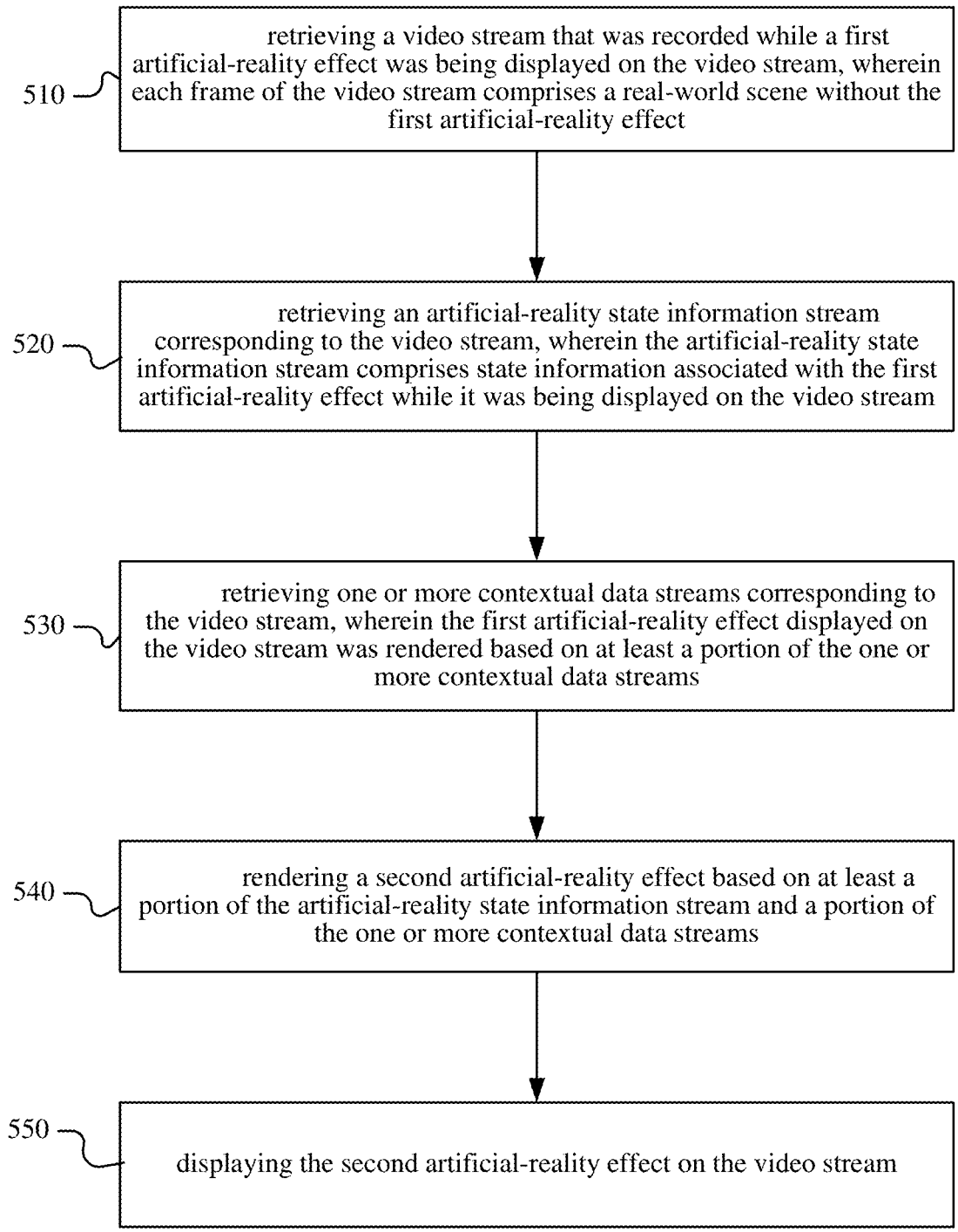
FIG. 5 illustrates an example method for rendering an artificial-reality effect on a post-capture video stream.

FIG. 5 illustrates an example method 500 for rendering an artificial-reality effect on a post-capture video stream. The method may start at step 510, wherein a computing device may retrieve a video stream that was recorded while a first artificial-reality effect was being displayed on the video stream. Each frame of the video stream may comprise a real-world scene without the first artificial-reality effect. At step 520, the computing device may retrieve an artificial-reality state information stream corresponding to the video stream. The artificial-reality state information stream may comprise state information associated with the first artificial-reality effect while it was being displayed on the video stream. At step 530, the computing device may retrieve one or more contextual data streams corresponding to the video stream. The first artificial-reality effect displayed on the video stream may have been rendered based on at least a portion of the one or more contextual data streams. At step 540, the computing device may render a second artificial-reality effect based on at least a portion of the artificial-reality state information stream and a portion of the one or more contextual data streams. At step 550, the computing device may display the second artificial-reality effect on the video stream.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for rendering an artificial-reality effect on a post-capture video stream including the particular steps of the method of FIG. 5, this disclosure contemplates any suitable method for rendering an artificial-reality effect on a post-capture video stream including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Network Environment

Figure 6:
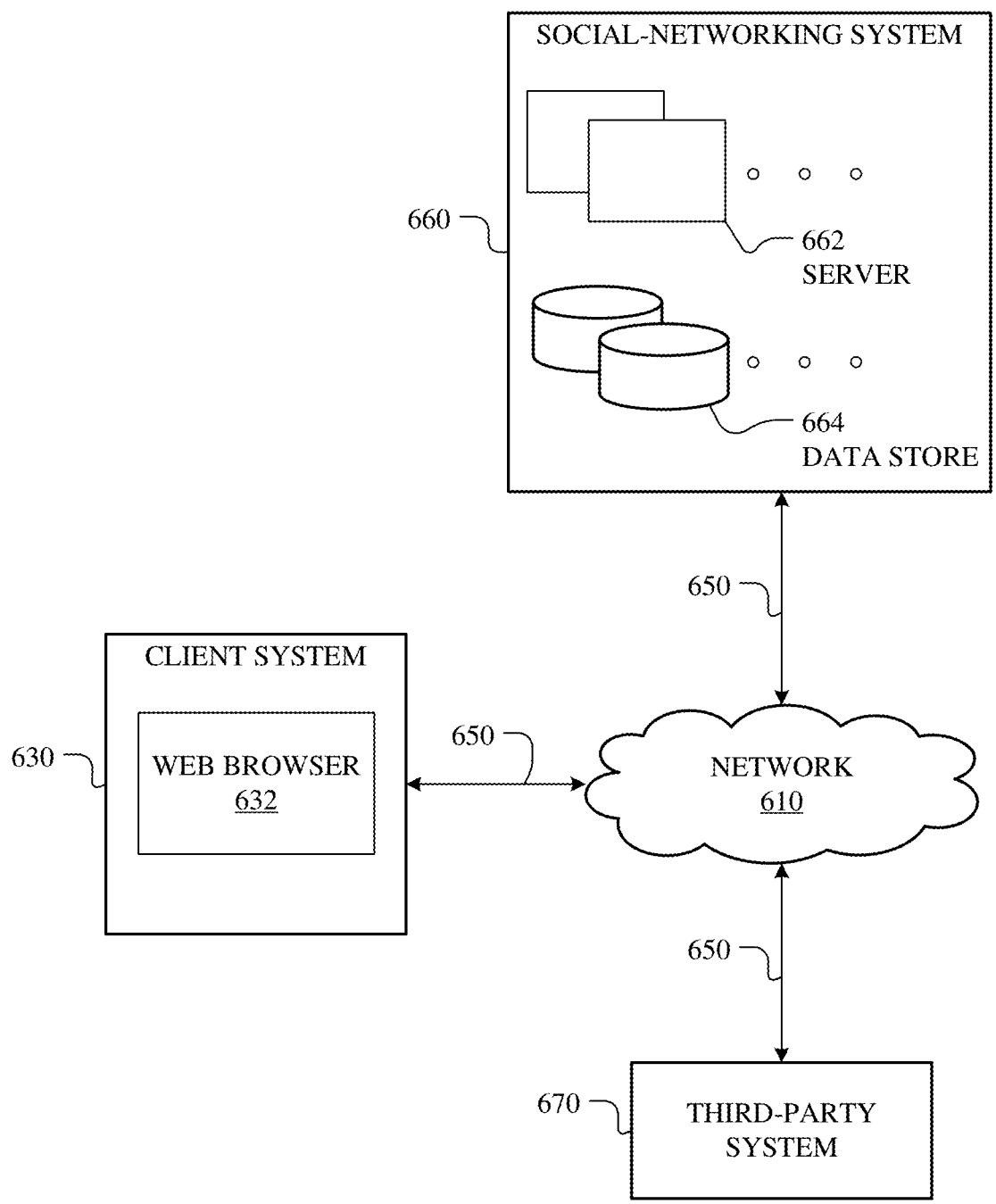
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Computer System

Figure 7:
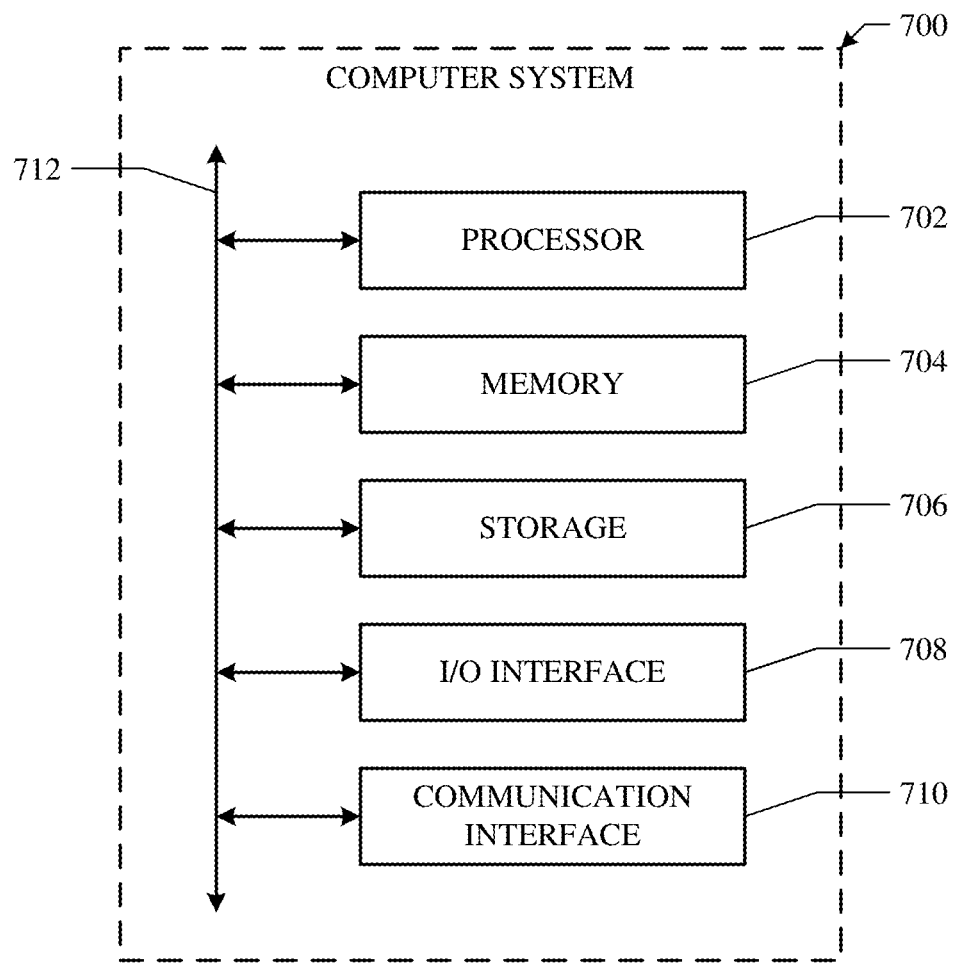
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    retrieving, by a computing device, a video stream that was recorded while a first artificial-reality effect was being displayed on the video stream, wherein each frame of the video stream comprises a real-world scene without the first artificial-reality effect;
    retrieving, by the computing device, an artificial-reality state information stream corresponding to the video stream, wherein the artificial-reality state information stream comprises randomness data used for generating one or more non-deterministic features of the first artificial-reality effect while it was being displayed on the video stream;
    retrieving, by the computing device, one or more contextual data streams corresponding to the video stream, wherein the first artificial-reality effect displayed on the video stream was rendered based on at least a portion of the one or more contextual data streams;
    rendering, by the computing device, a second artificial-reality effect based on at least a portion of the artificial-reality state information stream and a portion of the one or more contextual data streams, wherein the computing device utilizes the retrieved randomness data for rendering one or more non-deterministic features of the second artificial-reality effect; and
    displaying, by the computing device, the second artificial-reality effect on the video stream.

2. The method of claim 1, wherein the one or more contextual data streams comprise a sensor data stream generated by one or more sensors while the video stream is being captured.

3. The method of claim 2, wherein the one or more sensors comprises one or more of:
    an inertial measurement unit (IMU);
    an accelerometer;
    a device orientation sensor;
    a motion sensor;
    a velocity sensor;

a device position sensor;
a microphone;
a light sensor;
a touch sensor;
a stylus sensor;
a depth sensor;
a temperature sensor;
a GPS sensor; or
a user input sensor.

4. The method of claim 1, wherein the one or more contextual data streams comprise a computed data stream generated by an object tracking algorithm performed on content of the video stream.

5. The method of claim 4, wherein the computed data comprises one or more of:
face recognition data;
face tracking points;
person segmentation data;
object recognition data;
object tracking points;
object segmentation data;
body tracking points;
world tracking points;
a depth;
a point in a three-dimensional space;
a line in a three-dimensional space;
a surface in a three-dimensional space; or
a point cloud.

6. The method of claim 1, wherein the second artificial-reality effect is determined based on an input of a user associated with the computing device.

7. The method of claim 6, wherein determining the second artificial-reality effect based on the input of the user comprises:
presenting choices for the second artificial-reality effect to the user;
receiving an indication of a user choice from one or more input sensors associated with the computing device; and
determining the second artificial-reality effect based on the indication of the user choice.

8. The method of claim 7, wherein the choices for the second artificial-reality effect comprise no artificial-reality effect, the first artificial-reality effect, or one or more artificial-reality effects different from the first artificial-reality effect.

9. The method of claim 1, wherein the one or more non-deterministic features comprise:
a size of a rain drop;
a path of a rain drop;
a timing of a rain drop;
a size of a snowflake;
a path of a snowflake;
a timing of a snowflake;
a direction of a flying arrow;
a trajectory of a flying arrow;
a timing of a flying arrow;
a size of a bubble;
a moving path of a bubble; or
a moving speed of a bubble.

10. The method of claim 1, wherein, if the second artificial-reality effect is the first artificial-reality effect, the computing device renders the second artificial-reality effect identical to the first artificial-reality effect based on at least a portion of the artificial-reality state information stream and a portion of the one or more contextual data streams, wherein one or more non-deterministic features of the second artificial-reality effect are generated based at least on the randomness data in the artificial-reality state information stream.

11. The method of claim 1, further comprising:
receiving, by the computing device, an indication, from one or more input sensors associated with the computing device, that a user associated with the computing device wants to switch to a third artificial-reality effect in the middle of replaying the video stream;
stopping, by the computing device, rendering the second artificial-reality effect on the video stream;
rendering, by the computing device, the third artificial-reality effect based on at least a portion of the artificial-reality state information stream and a portion of the one or more contextual data streams; and
displaying, by the computing device, the third artificial-reality effect on the video stream.

12. The method of claim 11, wherein the computing device utilizes the randomness data in the artificial-reality state information stream for one or more non-deterministic features of the third artificial-reality effect.

13. The method of claim 1, wherein the first artificial-reality effect comprises one or more of:
a virtual object;
a three-dimensional effect;
an interaction effect;
a displaying effect;
a sound effect;
a lighting effect; or
a tag.

14. One or more computer-readable non-transitory storage media embodying software that is operable when executed to:
retrieve a video stream that was recorded while a first artificial-reality effect was being displayed on the video stream, wherein each frame of the video stream comprises a real-world scene without the first artificial-reality effect;
retrieve an artificial-reality state information stream corresponding to the video stream, wherein the artificial-reality state information stream comprises randomness data used for generating one or more non-deterministic features of the first artificial-reality effect while it was being displayed on the video stream;
retrieve one or more contextual data streams corresponding to the video stream, wherein the first artificial-reality effect displayed on the video stream was rendered based on at least a portion of the one or more contextual data streams;
render a second artificial-reality effect based on at least a portion of the artificial-reality state information stream and a portion of the one or more contextual data streams, wherein the computing device utilizes the retrieved randomness data for rendering one or more non-deterministic features of the second artificial-reality effect; and
display the second artificial-reality effect on the video stream.

15. The media of claim 14, wherein the one or more contextual data streams comprise a sensor data stream generated by one or more sensors while the video stream is being captured.

16. The media of claim 15, wherein the one or more sensors comprises one or more of:
an inertial measurement unit (IMU);
an accelerometer;
a device orientation sensor;

a motion sensor;
a velocity sensor;
a device position sensor;
a microphone;
a light sensor;
a touch sensor;
a stylus sensor;
a depth sensor;
a temperature sensor;
a GPS sensor; or
a user input sensor.

17. The media of claim 14, wherein the one or more contextual data streams comprise a computed data stream generated by an object tracking algorithm performed on content of the video stream.

18. The media of claim 17, wherein the computed data comprises one or more of:
face recognition data;
face tracking points;
person segmentation data;
object recognition data;
object tracking points;
object segmentation data;
body tracking points;
world tracking points;
a depth;
a point in a three-dimensional space;
a line in a three-dimensional space;
a surface in a three-dimensional space; or
a point cloud.

19. A system comprising: one or more processors; and a non-transitory memory coupled to the processors comprising instructions executable by the processors, the processors operable when executing the instructions to:
retrieve a video stream that was recorded while a first artificial-reality effect was being displayed on the video stream, wherein each frame of the video stream comprises a real-world scene without the first artificial-reality effect;
retrieve an artificial-reality state information stream corresponding to the video stream, wherein the artificial-reality state information stream comprises randomness data used for generating one or more non-deterministic features of the first artificial-reality effect while it was being displayed on the video stream;
retrieve one or more contextual data streams corresponding to the video stream, wherein the first artificial-reality effect displayed on the video stream was rendered based on at least a portion of the one or more contextual data streams;
render a second artificial-reality effect based on at least a portion of the artificial-reality state information stream and a portion of the one or more contextual data streams, wherein the computing device utilizes the retrieved randomness data for rendering one or more non-deterministic features of the second artificial-reality effect; and
display the second artificial-reality effect on the video stream.

* * * * *